Dec. 14, 1971

A. NAPOLI 3,626,536

AUTOMATIC VEHICLE WASHING APPARATUS

Filed Dec. 19, 1968

INVENTOR,
ANGELO NAPOLI

BY Christen, Sabol & O'Brien
ATTORNEYS

INVENTOR,
ANGELO NAPOLI
BY Christen, Sabol & O'Brien
ATTORNEYS

Dec. 14, 1971  A. NAPOLI  3,626,536

AUTOMATIC VEHICLE WASHING APPARATUS

Filed Dec. 19, 1968  5 Sheets-Sheet 3

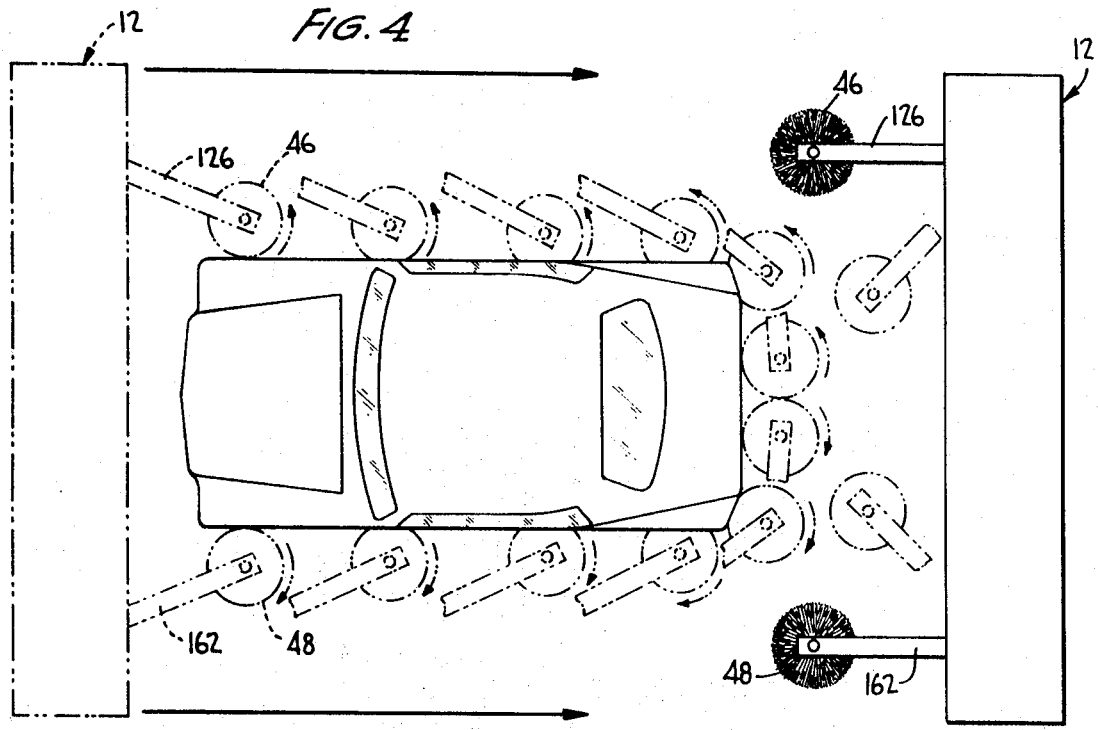
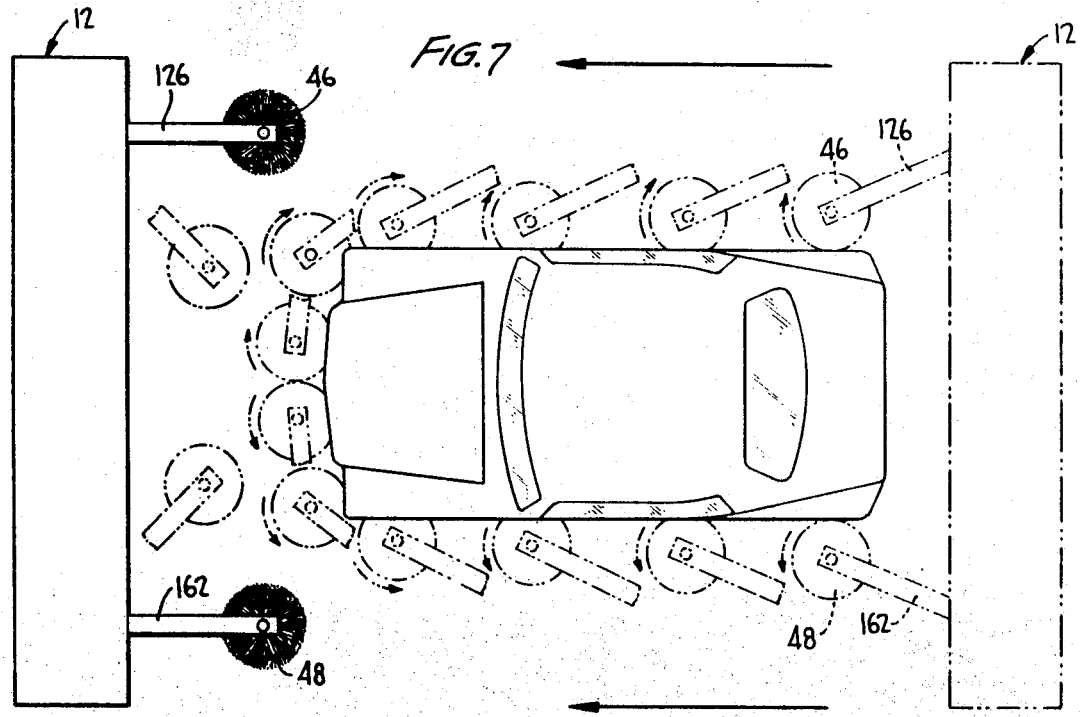

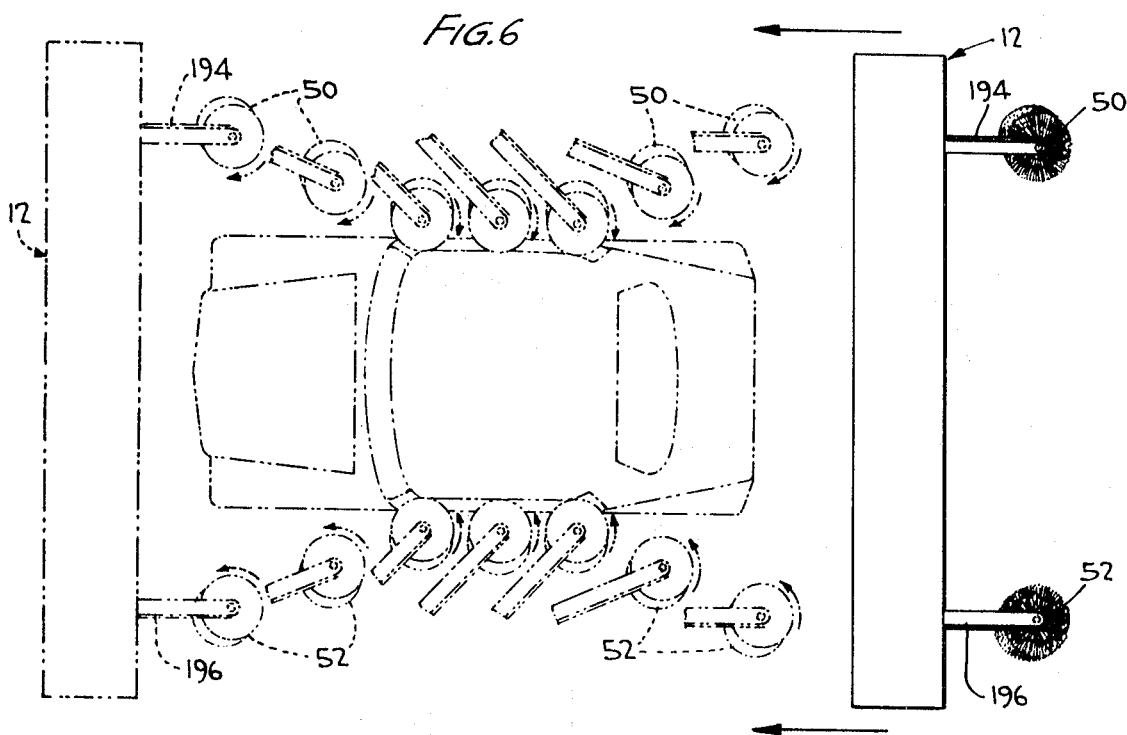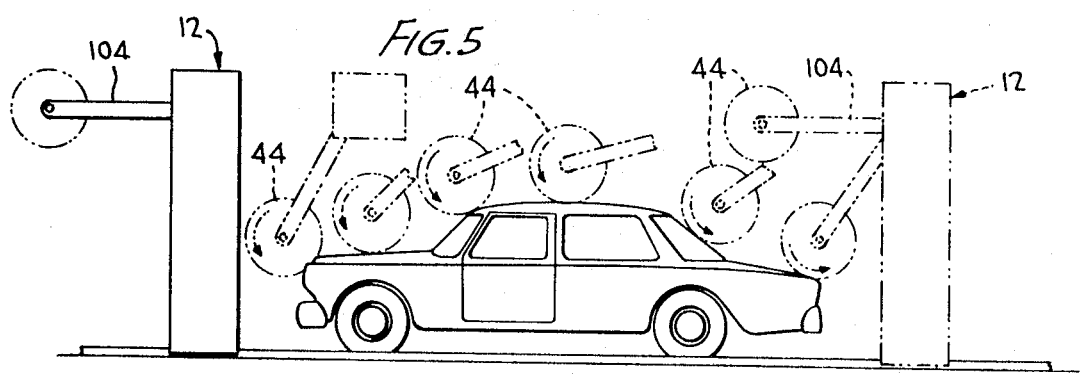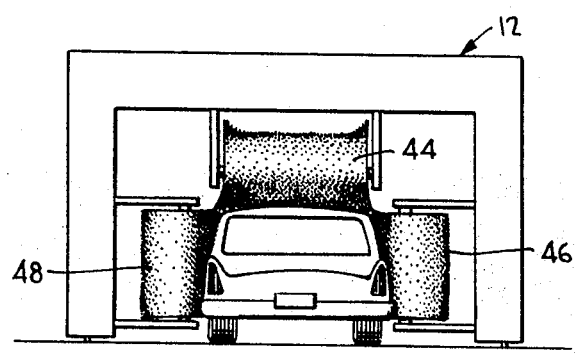

United States Patent Office 3,626,536
Patented Dec. 14, 1971

3,626,536
AUTOMATIC VEHICLE WASHING APPARATUS
Angelo Napoli, 1609 Wills Place, Vineland, N.J. 08360
Filed Dec. 19, 1968, Ser. No. 785,155
Int. Cl. B60s 3/06
U.S. Cl. 15—21 E
2 Claims

ABSTRACT OF THE DISCLOSURE

Apparatus for automatically washing vehicles including a frame movable along a pair of tracks to pass by a vehicle to be washed, a pair of side brushes supported by the frame, a top brush supported by the frame, a pair of window brushes supported by the frame, a plurality of nozzles on the frame for spraying liquid on the vehicle and brushes and system control circuitry for moving the frame past the vehicle four times including a first cycle in which the vehicle is washed by the top brush and side brushes, a second cycle in which the vehicle is washed by the side brushes and the windows of the vehicle are washed by the window brushes, a third cycle in which the vehicle is rinsed and waxed, and a fourth cycle in which the vehicle is dried by blowers.

BACKGROUND OF THE INVENTION

The present invention pertains to apparatus for automatically washing vehicles and more particularly to automatic vehicle washing apparatus supported on a movable frame for passing over a stationary vehicle.

The most frequently utilized conventional car wash apparatus is the type in which the car is towed through a stall wherein a plurality of sprays and brushes are disposed to wet and wash the car. The brushes in this type of apparatus have been found to be defective in that they are not capable of washing all surfaces of the car, and this type of apparatus is further ineffective due to the inaccuracies inherently present in towing cars of varying weight and physical dimensions. Normally, in order to overcome this problem, men are used to manually wash the car with brushes; however, this is disadvantageous economically due to the wasted manpower and also disadvantageous due to the human element of error in completely washing the car. Effectively, this type of operation is nothing more than a manually implemented procedure and is not an automatic system.

Automatic car wash apparatuses have been designed in the past such that the apparatus moves past a stationary car; however, these apparatuses have been ineffective to provide complete washing in that, while they are automatic and do not require constant human surveillance, the brushes do not wash the entire surface of the car due to the ineffective systems of operation. That is, the apparatus is not effective to wash all parts of the car due to both the physical positioning and characteristics of the brushes and the manner of using the brushes.

Existing automatic car washes also suffer from the disadvantage of not being capable of cleaning the windows of cars adequately. This problem is complicated by the slanted side windows on most cars which cannot be cleaned by vertically disposed side brushes or horizontally disposed top brushes.

Another problem confronting existing automatic vehicle washing apparatuses, and as yet unsolved, is how to effectively wash the front end and rear end of a car. The problem results from the use of side brushes which are effective for cleaning the sides of the car but not the front end or rear end due to their transverse surfaces. Furthermore, the front ends and rear ends of cars are normally composed of many components such as lights, tags, grills and bumpers which have irregular surfaces that can be thoroughly cleaned only by brushes applying pressure thereto.

The vehicle washing industry is plagued by many disadvantages and problems which are solved by the present invention such as efficient utilization of equipment, life of component parts, speed of washing and provision of drying means.

SUMMARY OF THE INVENTION

Accordingly, it is an object of the present invention to construct vehicle washing apparatus that is capable of thoroughly washing a vehicle automatically.

Another object of the present invention is to mount vehicle washing apparatus on a movable frame to provide automatic and thorough washing by moving the frame past a stationary vehicle.

The present invention has another object in that window brushes are utilized in movable vehicle washing apparatus to assure thorough washing of the side windows of a vehicle.

A further object of the present invention is to control the sequence of operation of automatic vehicle washing apparatus such that brush rotation is always in the same direction relative to the vehicle as movement of a frame on which the brushes are mounted.

Another object of the present invention is to construct apparatus for automatically washing vehicles quickly with a minimum of human supervision.

A further object of the present invention is to automatically rinse and wax a vehicle after it has been washed and automatically dry the vehicle.

Some of the advantages of the present invention over the prior art are that a vehicle of any size or shape may be thoroughly washed, that a vehicle may be waxed as it is rinsed to save time, that all surfaces of a vehicle are subject to transverse brush pressure as they are washed, and that a vehicle may be washed, waxed and dried automatically in a minimum of time.

The present invention is generally characterized in automatic vehicle washing apparatus including a movable frame having nozzle means disposed thereon, drive means for moving the frame in a first direction and a second direction, first, second and third brush means rotatably supported on the frame, first, second and third control means for controlling the position and rotation of the first, second and third brush means, respectively, and system control means including first actuating means for causing the drive means to move the frame past the vehicle in the first direction and for causing the first, second and third brush means to make rotating contact with the vehicle to be washed, and second actuating means for causing the drive means to move the frame past the vehicle in the second direction and for causing the first and second brush means to make rotating contact with the vehicle to be washed.

Further objects and advantages of the present invention will become apparent from the description of the preferred embodiment as shown in the accompanying drawings.

BRIEF DESCRIPTION OF THE DRAWINGS

FIG. 4 is a simplified top plan view illustrating the operation of the side brushes during the first cycle of operation.

FIG. 5 is a simplified side elevational view illustrating the operation of the top brush during the first cycle of operation.

FIG. 6 is a simplified top plan view illustrating the operation of the window brushes during the second cycle of operation.

FIG. 7 is a simplified top plan view illustrating the operation of the side brushes during the second cycle of operation.

FIG. 8 is a simplified front elevational view illustrating the cooperation between the top brush and the side brushes.

DESCRIPTION OF THE PREFERRED EMBODIMENT

The present invention will be described with respect to the washing of automobiles; however, due to the unique combination of brushes and sequence of operation, apparatus according to the present invention may be utilized to wash any type of vehicle and is not limited to automobiles.

Figure 1:
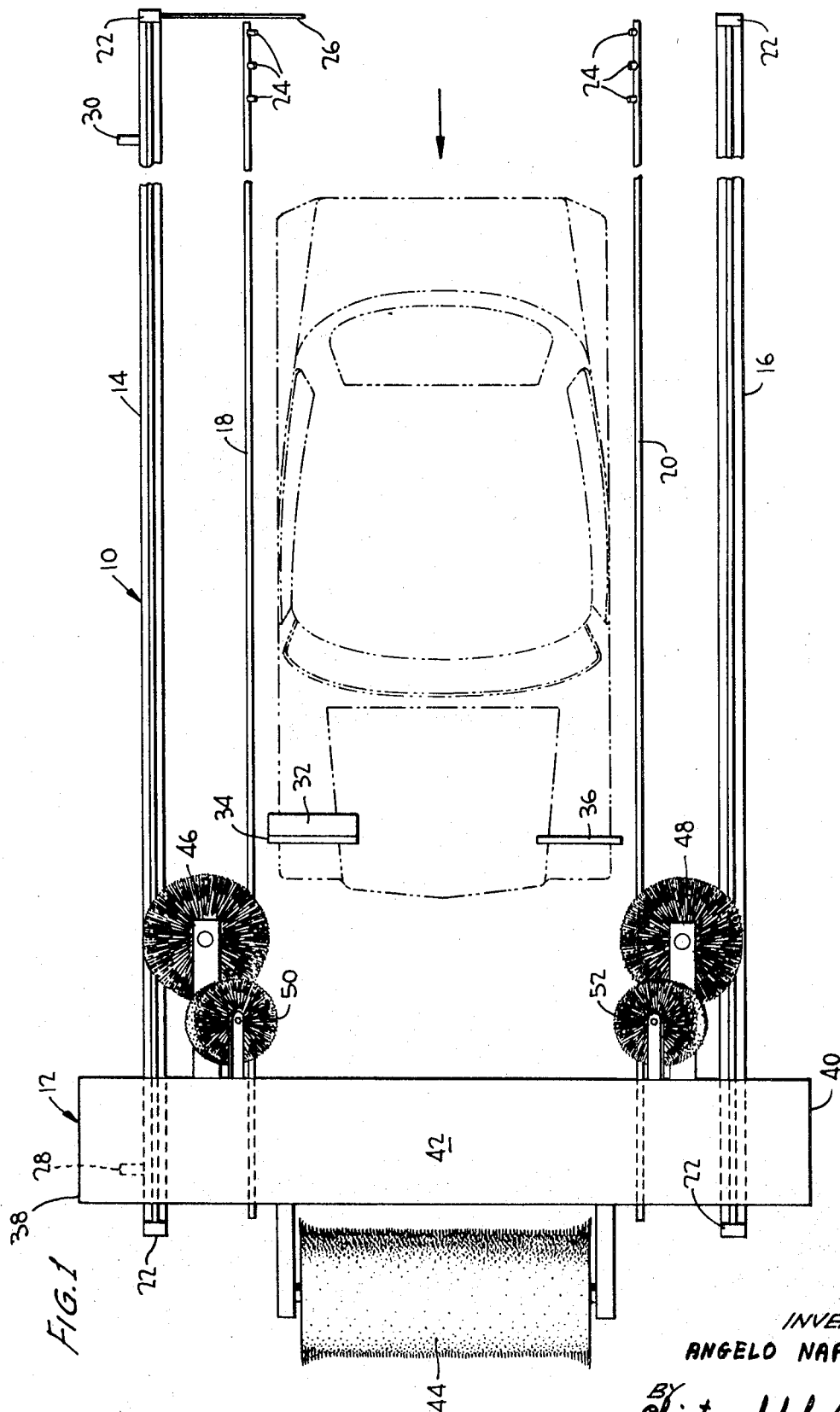
FIG. 1 is a top plan view of a stall housing the automatic vehicle washing apparatus of the present invention.

The apparatus of the present invention will be described with the aid of FIG. 1, which is a top plan view of a stall 10 housing a frame 12, and FIG. 2, which is an elevational view of frame 12 as seen from the exit of stall 10. In FIG. 1 all of the brushes on frame 12 are shown in their park positions whereas in FIG. 2 all of the brushes are shown in their operative positions.

Stall 10 may be disposed within a building (not shown) having an entrance to permit a car to be washed to enter stall 10 as shown by the arrow at the right side of FIG. 1. A pair of tracks 14 and 16 are disposed in parallel relation on the floor of stall 10, and a pair of wheel guides 18 and 20 are disposed in parallel relation within tracks 14 and 16 on the floor of stall 10. Each of tracks 14 and 16 is triangular in cross section, and stops 22 defining the end of travel of frame 12 are disposed at both ends of each of tracks 14 and 16. A plurality of nozzles 24 are disposed at the entrance ends of wheel guides 18 and 20 and are directed angularly up so that a spray of water from the nozzles will contact the wheels and underside of the cars to be washed, and accordingly wheel guides 18 and 20 may be tubular pipes for carrying water to nozzles 24.

Stop 22 on the right side of the entrance to stall 10 is elevated to a height of approximately three feet, and a pivotable wand 26 is mounted thereon at a height such that wand 26 will contact and be moved by the front right fender of a car entering stall 10. A block 28 projects laterally from the exit end of rail 14, and a block 30 projects laterally from the entrance end of rail 14. A rounded, depressed treadle 32 is located in the floor on the right side of stall 10, and a ridge 34 is disposed adjacent treadle 32. A ridge 36 is aligned with ridge 34 and is disposed on the floor on the left side of stall 10.

Frame 12 has an arch or inverted U shape and includes side housings 38 and 40 and a top housing 42. As will be explained in more detail hereinafter, a top brush 44 is pivotally supported on a horizontal axis from top housing 42 and, as shown in FIG. 1, is raised to a parallel position with top housing 42 when in its park position. A pair of side brushes 46 and 48 are pivotally mounted on parallel vertical axes from side housings 38 and 40, respectively, and, as shown in FIG. 1, are pivoted to a position outside wheel guides 18 and 20 when in their park positions. A pair of window brushes 50 and 52 are angularly, pivotally mounted on the rear wall of frame 12 and, in their park positions are drawn beyond wheel guides 18 and 20.

Figure 2:
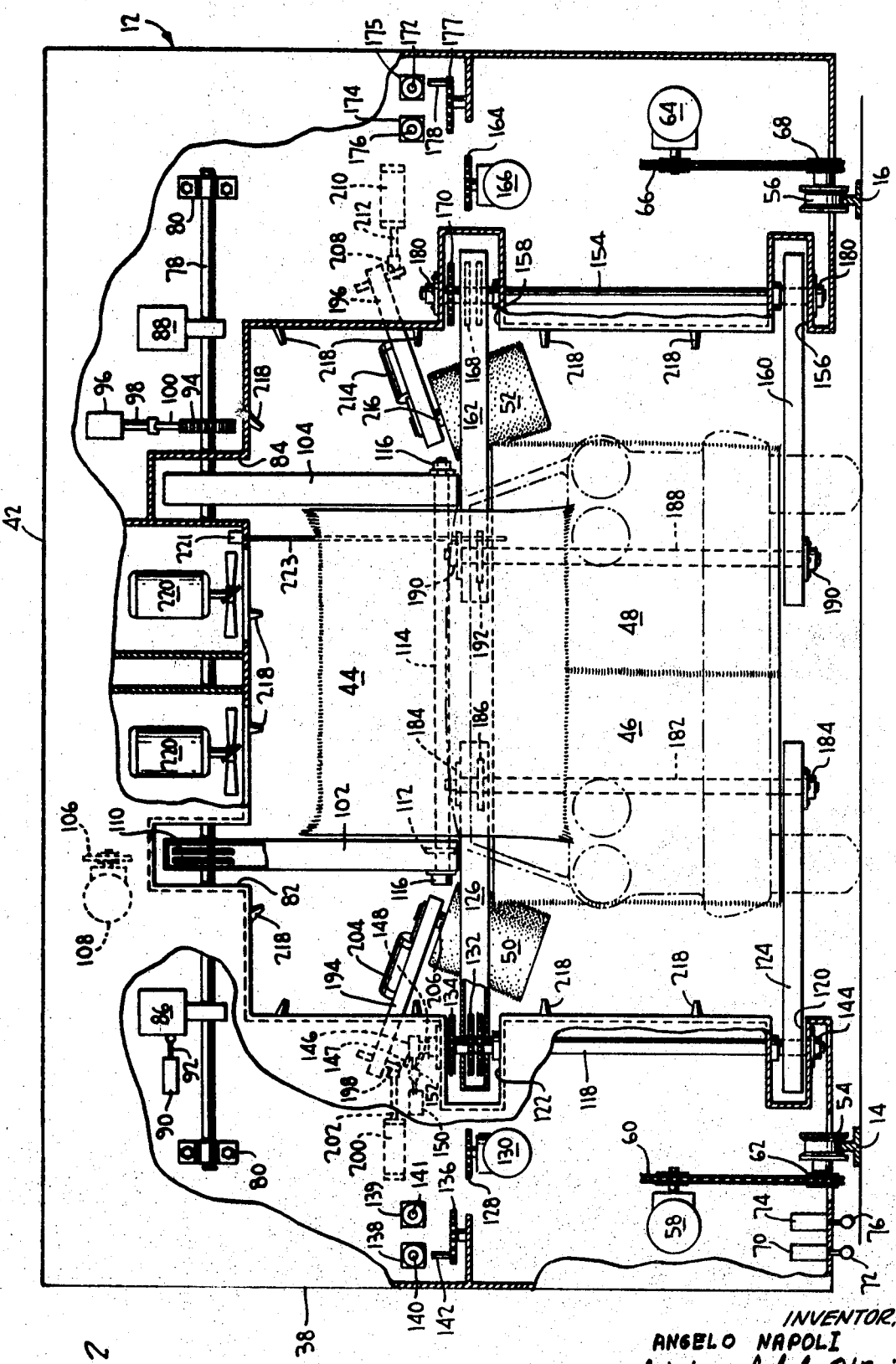
FIG. 2 is a rear elevational view with parts broken away of the automatic vehicle washing apparatus of FIG. 1.

The washing and control apparatus housed in frame 12 will now be described in detail as shown in FIG. 2 with the realization that top brush 44, side brushes 46 and 48 and window brushes 50 and 52 are illustrated in their fully extended operating positions.

Frame 12 is supported by grooved wheels 54 and 56 mounted at the bottom of and extending through side housings 38 and 40 to engage tracks 14 and 16, respectively. An electric motor 58 is mounted in side housing 38 above wheel 54 and has a drive shaft 60 aligned with a drive sprocket 62 connected with wheel 54. Similarly, an electric motor 54 is mounted above wheel 56 in side housing 40 and has a drive shaft 66 aligned with a drive sprocket 68 connected with wheel 56. An electrical limit switch 70 is mounted at the bottom of side housing 38 and has an actuator arm 72 extending therethrough of a length sufficient to permit switch 70 to be actuated by block 28. Similarly, an electrical limit switch 74 is mounted at the bottom of side housing 38 adjacent switch 70 and has an actuator arm 76 extending therethrough of a length sufficient to permit switch 74 to be actuated by block 30.

A shaft 78 is horizontally supported in top housing 42 by a plurality of pillow block bearings 80 and extends through a slot 82 and a slot 84 in top housing 42. A pair of counterweights 86 and 88 are symmetrically attached to shaft 78, and an electrical limit switch 90 is mounted adjacent counterweight 86 and has an actuator arm 92 extending therefrom of a length such that switch 90 may be actuated by counterweight 86. An actuator sprocket 94 is secured to shaft 78 just to the right of slot 84, and an air cylinder 96 is mounted above sprocket 94 and has a piston 98 connected with a rod 100 which contacts sprocket 94.

A pair of brush support arms 102 and 104 are secured to shaft 78 in slots 82 and 84, respectively, and support arm 102 has an open end facing top housing 42 to permit a drive chain (not shown) to be engaged by a drive shaft 106 of an electric motor 108.

Support arm 102 has a double sprocket 110 mounted on bearings around shaft 78 and a double sprocket 110 has a first sprocket aligned with drive shaft 106 to receive the drive chain and a second sprocket aligned with a sprocket 112 disposed in the lower end of support arm 102. Sprocket 112 is secured to a hub assembly 114 which is rotatably secured to support arms 102 and 104 by a pair of flange bearings 116, respectively. Support arms 102 and 104 support top brush 44 which is preferably a Paralax brush with long strands that extend due to centrifugal forces during rotation of hub assembly 114. This type of brush is advantageously used with the present invention in that the strands of the brush may extend or contract to conform to the exact contour of the surface of the vehicle being washed to provide mild pressure and obtain thorough washing. The strands at the ends of top brush 44 are longer than the strands at the center, as shown in FIG. 8, in order to permit thorough washing of vehicles with roofs of varying dimensions.

A shaft 118 is vertically supported in side housing 38 and extends through a lower slot 120 and an upper slot 122 in side housing 38. A pair of side brush support arms 124 and 126 are secured to shaft 118 in slots 120 and 122 respectively, and support arm 126 has an open end for permitting a drive chain (not shown) to engage a drive shaft 128 of an electric motor 130 and a first sprocket of a double sprocket 132 rotatably disposed on shaft 118 in support arm 126. A sprocket 134 is secured to shaft 118 above support arm 126 and is aligned with an actuator sprocket 136 which is supported on side housing 38. Two air cylinders 138 and 139 are mounted above sprocket 136, and air cylinder 138 has a piston 140 adapted to engage a protrusion 142 on sprocket 136. Similarly, air cylinder 139 has a piston 141 adapted to engage protrusion 142 from a direction opposite to that of piston 140. A pair of flange bearings 144 are utilized to rotatably secure shaft 118 in side housing 38, and shaft 118 extends above upper flange bearing 144 to support a collar 146 having extensions 147 and 148 thereon. An electrical switch 150 is mounted adjacent collar 146 and has an actuator arm 152 extending therefrom having a length sufficient to permit extensions 147 and 148 to actuate switch 150.

A shaft 154 is vertically supported in side housing 40 and extends through a lower slot 156 and an upper slot 158 in side housing 40. A pair of side brush support arms 160 and 162 are secured to shaft 154 in slots 156 and 158, respectively, and support arm 162 has an open end for permitting a drive chain (not shown) to engage a drive shaft 164 of an electric motor 166 and a first sprocket of a double sprocket 168 rotatably disposed on shaft 154 in support arm 162. A sprocket 170 is secured to shaft 154 above support arm 162 and is aligned with an actuator sprocket 172 which is supported on side housing 40. Two air cylinders 174 and 175 are mounted above sprocket 172 and air cylinder 174 has a piston 176 adapted to engage a protrusion 178 on sprocket 172. Similarly, air cylinder 175 has a piston 177 adapted to engage protrusion 178 from a direction opposite to that of piston 176. A pair of flange bearings 180 are utilized to rotatably secure shaft 154 in side housing 40.

A hub assembly 182 is rotatably secured to support arms 124 and 126 by a pair of flange bearings 184, and a sprocket 186 is secured to hub assembly 182 and is aligned with a second sprocket of double sprocket 132. Similarly, a hub assembly 188 is rotatably secured to support arms 160 and 162 by a pair of flange bearings 190, and a sprocket 192 is secured to hub assembly 188 and is aligned with a second sprocket of double sprocket 168. Side brushes 46 and 48 are secured to hub assemblies 182 and 188, respectively, and are preferably Paralax brushes which have long strands that extend from the hub assemblies due to centrifugal force to permit light pressure and thorough washing because of their ability to conform to the contour of the surface being washed.

Window brushes 50 and 52 are pivotally supported on the front walls of side housings 38 and 40 by means of brush support arms 194 and 196, respectively. Support arm 194 is secured to an angularly disposed rotatable pin 198 which is mounted on side housing 38, and an air cylinder 200 is disposed adjacent pin 198 and has a piston 202 which engages a collar on pin 198. An electric motor 204 is secured to the top of support arm 194 and is connected with a hub assembly 206 of window brush 50 to cause rotation. Similarly, support arm 196 is secured to an angularly disposed rotatable pin 208 which is mounted on side housing 40, and an air cylinder 210 is disposed adjacent pin 208 and has a piston 212 which engages a collar on pin 208. An electric motor 214 is secured to the top of support arm 198 and is connected with a hub assembly 216 of window brush 52 to cause rotation. Window brushes 50 and 52 are preferably Paralax brushes which have long strands that extend from hub assemblies 206 and 216, respectively, to fit the contour of the surface of the window being washed to provide light pressure and thorough washing.

A plurality of nozzles 218 are disposed on the inside walls of side housing 38 and 40 and the lower wall of top housing 42 and are directed such that streams of fluid emanating therefrom will wet the entire surface of a vehicle to be washed as well as side brushes 46 and 48. Two blowers 220 are mounted in top housing 42 in a pair of parallel, cylindrical ducts and cooperate with openings in the lower wall of top housing 42 to permit air to be blown onto a vehicle to be washed. An electrical limit switch 221 is mounted on the rear wall of top housing 42 and has an actuator wand 223 extending downward therefrom having a length to permit actuation of switch 221 by contact between wand 223 and the roof of a vehicle to be washed.

Figure 3:
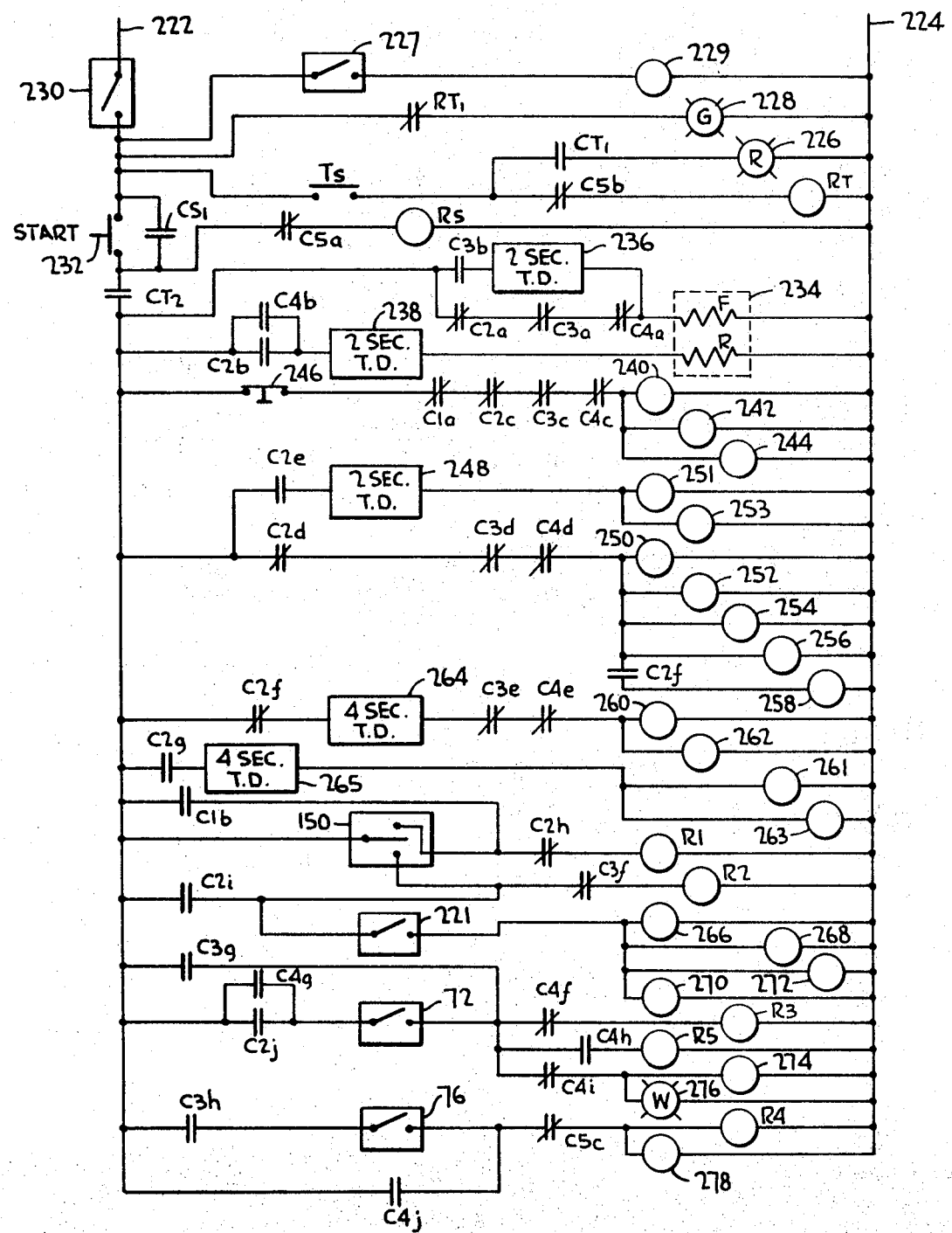
FIG. 3 is a schematic diagram of system control circuitry for use with the present invention.

FIG. 3 is a schematic diagram of system control circuitry for providing the proper sequence of operation of the vehicle washing apparatus of the present invention; however, it should be noted that the circuitry shown in FIG. 3 is merely an exemplary embodiment and many other components and circuit designs could be utilized with the present invention.

Two power lines 222 and 224 are illustrated at the top of FIG. 3 and are adapted to be connected to any suitable source of electrical power such as a 120 volt 60 Hz. supply. A switch 227 associated with wand 26 shown in FIG. 1, is coupled in series with a solenoid 229 across lines 222 and 224 to control the supply of water to nozzles 24 at the entrance of stall 10. Connected in series between lines 222 and 224 are a treadle switch TS, which is associated with treadle 32 of FIG. 1, normally closed contacts C5b, and a relay RT. Treadle switch TS is further in series with normally open contacts CT1 and a red light 226. Also connected between lines 222 and 224 is the series combination of normally closed contacts RT1 and green light 228, and a power control switch 230 is connected in series in line 222 along with a push button start switch 232 and normally open contacts CT2. Push button switch 232 is bypassed by normally open contacts CS1, and a series combination of normally closed contacts C5a and a relay RS is connected to line 222 between switch 232 and contacts CT2 and to line 224. A motor circuit 234 has a forward winding F connected between lines 222 and 224 by the parallel combination of normally closed contacts C2a, C3a and C4a and normally open contacts C3b and a two-second time delay 236. The reverse winding R of motor circuit 234 is connected across lines 222 and 224 by the parallel combination of normally open contacts C2b and C4b connected in series with a two-second time delay 238.

A relay 240 for controlling detergent and water o be directed onto the vehicle to be washed is connected in parallel with a relay 242 which controls the operation of motor 108 to cause rotation of top brush 44 and a solenoid 244 which controls the operation of air cylinder 96 to raise and lower top brush 44. The parallel combination of relay 240, relay 242 and solenoid 244 is connected in series with normally closed contacts C1d, C2c, C3c and C4c and a normally closed push button switch 246 across lines 222 and 224.

Normally closed contacts C2d, C3d and C4d are connected in series with the parallel combination of a relay 250 for controlling the operation of motor 130 in a first direction, a relay 252 for controlling the operation of motor 166 in a first direction, a solenoid 254 for controlling a valve for directing a spray through a nozzle 218 to side brush 46, a solenoid 256 for controlling a valve for directing a spray through a nozzle 218 to side brush 48, and the series combination of normally open contacts C2f and a solenoid 258 for directing clean water onto the vehicle to be washed.

A relay 251 for controlling the operation of motor 130 in a direction opposite to its first direction and a relay 253 for controlling the operation of motor 166 in a direction opposite to its first direction are connected in parallel and are coupled to line 222 through normally open contacts C2e and a two-second time delay 248.

A solenoid 260 for controlling the operation of air cylinder 138 and a solenoid 262 for controlling the operation of air cylinder 174 are connected in parallel and are coupled across lines 222 and 224 by the series combination of normally closed contacts C2f, C3e and C4e and a four-second time delay 264. Similarly, a solenoid 261 for controlling the operation of air cylinder 139 is in parallel with a solenoid 263 for controlling the operation of air cylinder 175 and the parallel combination is connected between lines 222 and 224 by normally open contacts C2g and a four-second time delay 265.

A control relay R1 is connected in series with normally closed contacts C2h and the parallel combination of normally open contacts C1b and the first contact position of side brush limit switch 150. The second contact position of side brush limit switch 150 couples normally closed contacts C3f and a control relay R2 across lines 222 and 224, and normally open contacts C2i are connected across switch 150 in its second contact position. Limit switch 221 is connected in series with the parallel combination of a relay 266 for controlling the operation of motor 204, a solenoid 268 for controlling air cylinder 200, a relay 270 for controlling the operation of motor 214, and a solenoid 272 for controlling the operation of air cylinder 210.

A control relay R3 is coupled across lines 222 and 224 through a series combination of normally closed contacts C4f and a parallel combination of normally open contacts C3g which are in parallel with limit switch 72 and a parallel combination of normally open contacts C4g and C2j, and relay R3 and a contact relay R5 connected in series with a normally open contact C4h and a control relay R5 are connected in parallel with contacts C4f and relay R3 as are normally closed contacts C4i and a relay 274 for controlling the operation of a wax pump and the application of rinse water to the plumbing. A light 276 is connected in parallel across relay 274 and in series with contacts C4i to indicate waxing operation.

A control relay R4 is connected in parallel with a blower relay 278 which controls the operation of blower 220 and this parallel combination is coupled across lines 222 and 224 through normally closed contacts C5c and the parallel combination of normally open contacts C4j and the series combination of normally open contacts C3h and limit switch 76.

The operation of the present invention will be described with the aid of FIGS. 4, 5, 6, 7 and 8 which are simplified representations of the operation of side brushes 46 and 48 during the first cycle of operation, top brush 44 during the first cycle of operation, window brushes 50 and 52 during the second cycle of operation, side brushes 46 and 48 during the second cycle of operation and a front elevation showing complete coverage of the vehicle to be washed, respectively.

To commence operation of the automatic vehicle washing apparatus of the present invention the vehicle to be washed enters stall 10 at the right side of FIG. 1 and moves pivotal wand 26 which causes closure of switch 227 shown in FIG. 3. Of course power control switch 230 is closed at this time since it controls power for the entire system. The closure of switch 227 energizes solenoid 229 to open a valve permitting water to be supplied to nozzles 24 which provides a high-pressure jet spray to wash the wheels and under part of the vehicle as it passes. When the rear of the car has passed wand 26 it returns to its normal position thereby opening switch 227 and stopping the jet spray from nozzles 24.

As the vehicle enters stall 10 green light 228 will be energized through normally closed contacts RT1. When the right front wheel of the vehicle engages treadle 32 switch TS is closed which energizes relay RT to deenergize green light 228 and energize red light 226 indicating to the driver of the vehicle that he should stop and park the vehicle. Ridges 34 and 36 also serve to stop the vehicle in the correct position. Once the vehicle is parked with its right front wheel on threadle 32, push button switch 232 is actuated to complete a circuit through line 222, contacts C5a and relay RS to line 224 which closes contacts CS1 across switch 232.

Since normally open contacts CT2 are closed due to energization of relay RT, current is provided to forward winding F of motor circuit 234 through normally closed contacts C2a, C3a and C4a. Due to closed switch 245 and normally closed contacts C1a, C2c, C3c and C4c, detergent relay 240 is energized to cause a mixture of water and detergent to be sprayed on the vehicle from nozzles 218, relay 242 is energized to start motor 108 and commence rotation of top brush 44, and solenoid 224 is energized to cause air cylinder 96 to rotate shaft 78 through sprocket 94 to lower top brush 44 from its park position. Side brushes 46 and 48 commence rotation due to the circuit completed through normally closed contacts C2d, C3d and C4d which start motors 130 and 166, and similarly solenoids 254 and 256 are energized to cause side brushes 46 and 48 to be wet down by sprays from nozzles 218.

Thus at the beginning of the first cycle of operation motor circuitry 234 operates motors 58 and 64 to rotate wheels 54 and 56 to drive frame 12 from the front to the rear of the vehicle, and at the same time the vehicle is sprayed with a mixture of detergent and water through nozzle 218, top brush 44 is lowered and is rotating in a counterclockwise direction as shown in FIG. 5 due to the energization of motor 108 by relay 242, and side brushes 46 and 48 are wet down and are rotating in a counterclockwise and clockwise direction in their park positions, respectively.

After a four-second delay caused by the time delay 264, solenoids 260 and 262 are energized through normally closed contacts C2f, C3e, and C4e to actuate air cylinders 138 and 174 which engage protrusions 142 and 178 to rotate sprockets 136 and 134 and sprockets 172 and 170, respectively, to cause side brushes 46 and 48 to leave their park positions and engage the side of the vehicle. The pressure applied by air cylinders 138 and 178 causes side brushes 46 and 48 to contact the vehicle with approximately sixty pounds of pressure to provide thorough cleaning.

As shown in FIG. 4, side brushes 46 and 48 are moved along the sides of the vehicle while rotating in a direction such that the relative movement of brushes 46 and 48 and the vehicle is in the same direction as the movement of frame 12 to provide a thorough washing. As frame 12 reaches the rear end of the vehicle, brushes 46 and 48 leave the sides of the vehicle and due to the bias provided by air cylinders 138 and 174, move transversely across the rear of the vehicle until they meet in the center thoroughly washing the rear end of the vehicle.

As frame 12 moves from the front to the rear of the vehicle, as best shown in FIG. 5, top brush 44 comes in contact with the vehicle under sixty pounds of pressure from air cylinder 96 and washes the hood, the front windows, the top, the back windows and the trunk. Top brush 44 rotates in a direction such that the relative movement between brush 44 and the vehicle is in the same direction as the movement of frame 12. When side brushes 46 and 48 change direction to wash the rear of the vehicle there in a tendency for top brush 44 to meet side brushes 46 and 48; however, side brush limit switch 150 is engaged by extension 148 on collar 146 as brushes 46 and 48 change direction and side brush limit switch 150 is thereby placed in its first contact position to energize relay R1 through normally closed contacts C2h. Energization of relay R1 causes closure of normally open contacts C1b in order to maintain relay R1 energized after switch 150 has returned to its normal position. Energization of relay R1 causes the deenergization of detergent relay 240, top brush relay 242 and top brush solenoid 244 through the opening of normally closed contacts C1a thereby causing top brush 44 to be raised to its park position, stopping the rotation of top brush 44 and stopping the spray of detergent and water onto the vehicle.

As frame 12 continues its progress, brushes 46 and 48 meet at the center of the vehicle and at this time second extension 147 on collar 146 engages arm 152 to place switch 150 in its second contact position to energize relay R2 through normally closed contact C2 which signifies the end of the first cycle of operation. In summary, the operation of the automatic vehicle washing apparatus during the first cycle is such that frame 12 moves from the front to the rear of the vehicle, top brush 44 is placed in its operating position immediately, washes the top surfaces of the vehicle and is placed in its park position, side brushes 46 and 48 are placed in their operating positions after a four-second delay to assure first contact is with the sides of the vehicle, brushes 46 and 48 wash the rear end of the vehicle before entering opposite park positions, and a mixture of detergent and water is sprayed directly on the vehicle by nozzles 218 and is sprayed on side brushes 46 and 48.

Energization of relay R2 also signifies the beginning of the second cycle of operation and causes normally open contacst C2i to maintain energization of relay R2 after switch 150 is returned to its normal position. Energization of relay R2 deenergizes relay R1 due to the opening of normally closed contacts C2b, and the current to forward motor winding F is stopped due to the opening of normally closed contacts C2a. Top brush 44 will remain non-rotating and in its park position because although contacts C1a have been returned to their normally closed position, normally closed contacts C2c are open. The rotation of side brushes 46 and 48 is stopped due to the opening of normally closed contact C2d and will be started again in the opposite direction from the rotation during the first cycle of operation after a two second delay from time delay 248 by the closure of normally open contacts C2e which energize relays 251 and 253 after sufficient time is provided for the rotating motors 130 and 166 to stop and reverse operation. Side brushes 46 and 48 are pulled into a position on the rear of frame 12 opposite to their normal park position and with the apparatus in these conditions the second cycle is started.

After a two second delay to permit reversal of the operation of motors 58 and 66 due to time delay 238 reverse motor winding R is energized to cause frame 12 to be moved from the rear of the vehicle to the front. After a four second delay caused by time delay 265, solenoids 261 and 263 are energized due to the closure of normally open contacts C2g to permit side brushes 46 and 48 to be moved against the sides of the vehicle with sixty pounds of pressure by air cylinders 131 and 175 which moves sprockets 136 and 134 and sprockets 172 and 170 in directions opposite to their directions during the first cycle of operation. Top brush 44 remains in its park position and as frame 12 moves from the rear of the vehicle to the front, the vehicle is washed with side brushes 46 and 48 and the lines are cleaned of detergent by clean water under the control of solenoid 258.

As the frame approaches the rear window of the vehicle, wand 223 is pushed up by contact with the roof of the vehicle to actuate window switch 221 and energize relays 266 and 270 and solenoids 268 and 272. Relay 266 energizes motor 204 to rotate window brush 50 in a clockwise direction as shown in FIG. 6, and solenoid 268 permits air cylinder 200 to move window brush 50 into operating position to contact and wash the side windows of the vehicle. Similarly relay 270 energizes motor 214 to cause counterclockwise rotation of window brush 52, and solenoid 272 permits air cylinder 210 to move window brush 52 into operating position to contact and wash the side windows of the vehicle. Similar to side brushes 46 and 48, window brushes 50 and 52 rotate in the same direction as movement of frame 12. It is noted that window brushes 50 and 52 are angularly oriented towards the center of frame 12 so as to tangentially contact the slanted side windows of most vehicles. As frame 12 moves past the front edge of the roof of the vehicle, wand 223 is released thereby deenergizing relays 266 and 270 and solenoids 268 and 272 to return window brushes 50 and 52 to their part positions. When frame 12 passes the front of the vehicle side brushes 46 and 48 change direction to move towards the center of the frame and thoroughly wash the front end of the vehicle, as shown in FIG. 7.

As frame 12 approaches the end of the stall it moves past block 28 which actuates limit switch 72 to energize relay R3 which signifies the end of the second cycle of operation. In summary, during the second cycle of operation of the automatic vehicle washing apparatus side brushes 46 and 48 wash the sides and the front end of the vehicle, window brushes 50 and 52 wash the side windows of the vehicle, and clean water is sprayed on the vehicle.

Energization of relay R3 also signifies the beginning of the third cycle of operation and is maintained due to the closing of normally open contacts C3g, and relay R2 is deenergized by the opening of normally closed contacts C3f. The energization of relay R3 also prevents further current from being supplied to the reverse winding R of motors 60 and 64 and deenergizes relays 242, 250 and 252 and solenoids 244, 260 and 262.

After a two-second delay forward winding F of motor circuit 234 is energized through C3b and time delay 236 to cause frame 12 to travel from the front of the vehicle to the rear. During the third cycle of operation all brushes are in their park positions, and relay 274 is energized to start a wax pump and at the same time a controlled rinse of the vehicle as the frame moves past the stationary vehicle. Light 276 is also energized at this time to indicate that the waxing operation is in process. Frame 12 moves over the entire vehicle, rinsing and waxing all surfaces thereof, and as frame 12 approaches the end of stall 10 limit switch 76 is actuated by block 30 thereby energizing relay R4 and deenergizing relay R3 while at the same time maintaining the deenergized status of the brush circuitry. The energization of relay R3 signifies the end of the third cycle of operation of the automatic vehicle washing apparatus in which all brushes are in their park positions and the vehicle is rinsed and waxed.

Energization of relay R4 also signifies the beginning of the fourth cycle of operation, and after a two-second delay reverse winding R of motor circuit 234 is energized to cause frame 12 to travel from the rear of the vehicle to the front. Relay R4 is maintained in energization by the closing of normally open contacts C4j, and blowers 220 are energized for the duration of the fourth cycle by energization of relay 278. The operation of blowers 220 during the fourth cycle of operation dries the vehicle, and as frame 12 approaches the end of stall 10 limit switch 72 is again actuated by block 28. However, due to the open state of contact C4 only relay R5 is energized thereby, and relay R5 is not maintained in energization due to the lock of holding contacts associated therewith. When relay R5 is energized the circuit to relay Rt is open by the opening of contacts C5b thereby energizing green light 228 and deenergizing red light 226 along with permitting contacts Ct2 to return to its normally open position to open the supply circuit. The energization of relay R5 further deenergizes relay RS to open the contacts CS1 bypassing push button switch 232. Energization of relay R5 signifies the end of the fourth cycle of operation in which the vehicle was dried by blowers 220, and the apparatus is now ready to wash and wax another vehicle.

The cooperation between top brush 44 and side brushes 46 and 48 can best be seen from FIG. 3 which is a front elevation of the apparatus. It is noted that the elongated strands at the ends of top brush 44 permit the entire surface of roofs of varying dimensions to be thoroughly washed, and the height of side brushes 46 and 48 in cooperation with top brush 44 allow a complete washing of the vehicle.

There are three safety switches in the apparatus to prevent undesired operation. Under normal operation, none of these switches will be actuated; however, should a driver start his vehicle during operation of the apparatus or should it be desired to immediately stop operation of the apparatus for any reason, power switch 230 may be opened. If an obstruction of any type is present in stall 10 or if it is desired to raise top brush 44 to avoid an object that is on or part of a vehicle, push button switch 246 may be depressed to immediately raise top brush 44 to its park position. Safety limit switch 90 may be connected to an alarm or in series with the top brush circuitry such that if top brush 44 is forced out of proper position, it may be immediately brought to the attention of the operator or raised to its park position.

Start button 232 may be connected with a coin acceptance machine such that the apparatus may automatically commence operation upon the insertion of the correct amount of money in the machine and the proper placement of the vehicle to be washed.

The sequence of operation of the present invention provides optimum utilization of the apparatus, and by controlling the direction of rotation of the brushes so that the relative movement between the brushes and the surfaces of the vehicle is in the same direction as movement of the frame, thorough washing is accomplished with light pressure.

Thus it may be seen that the automatic vehicle washing apparatus of the present invention is capable of thoroughly washing all parts of vehicles of varying sizes and shapes due to the controlled rotation of the brushes and the use of transverse pressure on the side brushes for washing the front and rear ends of the vehicle. The entire sequence of operation of the present invention is completed in approximately ninety seconds thereby providing apparatus that is both thorough and fast.

Inasmuch as the present invention is subject to many variations, modifications and changes in detail, it is intended that all matter described in the foregoing specification or shown in the accompanying drawings shall be interpreted as illustrative and not in a limiting sense.

What is claimed is:

1. Automatic vehicle washing apparatus comprising in combination:
    a movable frame having a first side, a second side, and a top;
    nozzle means disposed on said frame for spraying fluid on a vehicle to be washed;
    drive means for moving said frame in a first direction and a second direction;
    first brush means;
    first pivotal mounting means rotatably supporting said first brush means on said first side of said frame and including first control means for controlling the position of said first brush means and the rotation of said first brush means;
    second brush means;
    second pivotal mounting means rotatably supporting said second brush means on said second side of said frame and including second control means for controlling the position of said second brush means and the rotation of said second brush means;
    third brush means;
    third pivotal mounting means rotatably supporting said third brush means on said top of said frame and including third control means for controlling the position of said third brush means and the rotation of said third brush means;
    fourth brush means;
    fourth pivotal mounting means rotatably supporting said fourth brush means on said frame and including fourth control means for controlling the position of said fourth brush means and the rotation of said fourth brush means; and
    system control means including first cycle actuating means for actuating said drive means to move said frame past the vehicle to be washed in said first direction, for operating said first control means, said second control means and said third control means such that said first brush means, said second brush means and said third brush means make rotating contact with the vehicle to be washed and for operating said nozzle means to spray fluid on the vehicle to be washed when said frame moves past the vehicle to be washed in said first direction, and said system control means further including second cycle actuating means for actuating said drive means to move said frame past the vehicle to be washed in said second direction and for operating said first control means and said second control means to reverse the rotation of said first brush means and said second brush means and to cause said first brush means and said second brush means to make rotating contact with the vehicle to be washed when said frame moves past the vehicle in said second direction said second cycle actuating means including an actuator supported on said top of said frame to control said fourth control means to cause said fourth brush means to make rotating contact with the side windows of the vehicle to be washed when said actuator is moved by the roof of the vehicle.

2. The invention as recited in claim 1 wherein said fourth brush means includes a first window brush and a second window brush; and said fourth pivotal mounting means includes a first arm pivotally mounted on said first side of said frame to support said first window brush at an angle from the vertical and a second arm pivotally mounted on said second side of said frame to support said second window brush at an angle from the vertical whereby said first window brush and said second window brush are angularly disposed to provide tangential contact with the side windows of the vehicle to be washed.

References Cited

UNITED STATES PATENTS

| | | | |
|---|---|---|---|
| 3,090,981 | 5/1963 | Vani et al. | 15—21 D |
| 3,238,551 | 3/1966 | Cirino et al. | 15—21 CO |
| 3,300,803 | 1/1967 | Seakan | 15—21 CO |
| 3,428,983 | 2/1969 | Seakan | 15—21 CO |
| 3,438,077 | 4/1969 | Eubanks | 15—21 CO |

OTHER REFERENCES

Auto Laundry News; June 1968, p. 58.

EDWARD L. ROBERTS, Primary Examiner

U.S. Cl. X.R.

15—DIG 2